(12) United States Patent
Hall et al.

(10) Patent No.: US 10,291,428 B2
(45) Date of Patent: *May 14, 2019

(54) SYSTEM AND METHOD FOR CLOUD-NETWORKED STAND-ALONE DUAL MODULATION LAN

(71) Applicant: Hall Labs LLC, Provo, UT (US)

(72) Inventors: David R. Hall, Provo, UT (US); Mark Hall, Springville, UT (US); Craig Boswell, Draper, UT (US)

(73) Assignee: Hall Labs LLC, Provo, UT (US)

(*) Notice: Subject to any disclaimer, the term of this patent is extended or adjusted under 35 U.S.C. 154(b) by 291 days.

This patent is subject to a terminal disclaimer.

(21) Appl. No.: 15/145,347

(22) Filed: May 3, 2016

(65) Prior Publication Data

US 2017/0324581 A1    Nov. 9, 2017

(51) Int. Cl.
| | |
|---|---|
| *H04W 84/12* | (2009.01) |
| *H04L 12/28* | (2006.01) |
| *H04L 12/46* | (2006.01) |
| *H04B 1/713* | (2011.01) |
| *H04L 27/10* | (2006.01) |
| *H04L 29/08* | (2006.01) |
| *H04L 27/00* | (2006.01) |

(52) U.S. Cl.
CPC ............ *H04L 12/46* (2013.01); *H04B 1/713* (2013.01); *H04L 27/0008* (2013.01); *H04L 27/10* (2013.01); *H04L 67/10* (2013.01); *H04W 84/12* (2013.01)

(58) Field of Classification Search
CPC ............. H04L 12/2803; H04L 12/2816; H04L 12/2818; H04L 12/283; H04L 12/2834
See application file for complete search history.

(56) References Cited

U.S. PATENT DOCUMENTS

| | | | |
|---|---|---|---|
| 5,438,329 A * | 8/1995 | Gastouniotis | .......... G01D 4/006 340/10.33 |
| 5,887,020 A | 3/1999 | Smith | |
| 6,859,831 B1 * | 2/2005 | Gelvin | ............... B60R 25/1004 709/224 |
| 6,865,216 B1 | 3/2005 | Beamish | |
| 7,676,198 B2 | 3/2010 | Mahany | |
| 8,326,348 B2 | 12/2012 | Choi | |

(Continued)

*Primary Examiner* — Scott M Sciacca

(57) ABSTRACT

A cloud-networked stand-alone local area network (LAN) is disclosed. A stand-alone LAN is networked to a server outside the stand-alone LAN, and the server is part of a cloud of servers. The server includes hardware processors that process system operation information updates from a user for the stand-alone LAN, hardware memory that stores the system operation information updates; and a transceiver for communicating the system operation information updates to the stand-alone LAN. The stand-alone LAN includes a primary network hub (PNH) having a microcontroller that stores the system operation information, a cloud-side transceiver networked to the cloud of servers for receiving the system operation information updates from the server, and a PNH LAN long range transceiver that communicates via a long range spread spectrum or a narrowband frequency shift keying signal. The stand-alone LAN also includes a peripheral device having a microcontroller and an actuation mechanism.

17 Claims, 11 Drawing Sheets

(56) References Cited

U.S. PATENT DOCUMENTS

| | | | |
|---|---|---|---|
| 2010/0148986 A1* | 6/2010 | Aunkofer | B60C 23/0418 |
| | | | 340/12.5 |
| 2011/0111700 A1* | 5/2011 | Hackett | A01G 25/16 |
| | | | 455/41.2 |
| 2016/0182247 A1* | 6/2016 | Cregg | H04L 12/282 |
| | | | 700/9 |
| 2017/0241660 A1* | 8/2017 | Sekar | F24F 11/30 |
| 2018/0040182 A1* | 2/2018 | Malhotra | G07C 9/00166 |

* cited by examiner

SYSTEM AND METHOD FOR CLOUD-NETWORKED STAND-ALONE DUAL MODULATION LAN

TECHNICAL FIELD

This invention relates generally to the field of cloud-networked networks, and more specifically to cloud-networked, stand-alone dual modulation networks.

BACKGROUND

Wireless local area networks (LANs) for home and commercial device automation typically rely on the internet for user control and/or device-device communication. Thus, when the Internet goes down, a user loses control of the automation devices, and the devices may, in some cases, become completely inoperable. This is because the instructions are stored on remote, off-site servers or on a user device that requires the Internet to communicate with the LAN. Sometimes the user device can communicate with a hub on the LAN via Bluetooth, Zigbee, Z-Wave protocols. However, signals on these protocols have limited range. It can be expensive, impractical, or impossible to ensure full signal coverage on such a LAN and to maintain operability of a device automation system networked in such a way. In many situations a user can lose complete control of system devices unless an expensive mesh of hubs are installed.

SUMMARY OF THE INVENTION

A cloud-networked, stand-alone dual modulation network and methods for communicating over such a network are described below which overcame many of the limitations of the current state of the art described above. Generally, the network includes one or more hubs networked to one or more cloud-based servers and one or more peripheral devices networked to the hubs via long range wireless communication. The hubs each have Long range transceivers and microcontrollers. The hub microcontrollers store system operation information and updates pushed to the hubs by the servers. The hub microcontrollers are also programmed with firmware that instructs the Long range transceivers to use either a long range spread spectrum (SS) signal for communicating information, or a narrowband frequency shift keying (FSK) signal. Additionally, the hub microcontrollers include firmware that instructs the Long range transceivers to listen for the long rangy SS or narrowband FSK signals.

The features just described offer several benefits over those systems described in the background above. First, the hubs are networked to cloud-based servers. This allows a user to push updates to the hubs from anywhere in the world there is an Internet connection. Additionally, the LAN is stand-alone, meaning all system operation information is stored at the hubs, and updates pushed to the hubs are stored at the hubs as well. Thus, the system remains operable even when the Internet goes down. In some embodiments, each hub and peripheral device includes one or more off-grid power sources, such that if the public power grid goes down, the hubs and devices are still operable, can still communicate device-to-device, and, in some cases, can be directly updated and controlled without need for the Internet.

Other benefits are related to the dual modulation features of the network. First, the long range transceivers communicate over the 900 MHz ISM channel, whereas other protocols operate at higher frequencies. Thus, the long range signals are more robust despite obstructions and long distances. Second, the dual modulation also enables the system to be more robust over longer distances and around obstructions, while still conserving power and extending battery life for peripheral devices. In some cases, battery life is two years or longer, depending on the amount of data the peripheral device sends and/or receives per use. In addition to these benefits, those of skill in the art will recognize other benefits not described herein, but inherent to the system.

In one embodiment, a system is described which includes a stand-alone LAN and a server outside the stand-alone LAN. The server is part of a cloud of servers, and includes hardware processors that process system operation information updates from a user for the stand-alone LAN, hardware memory that stores the system operation in formation updates, and a transceiver for communicating the system operation information updates to stand-alone LAN. The stand-alone LAN includes a primary network hub (PNH) and a peripheral device (PD). The PNH includes a PNH microcontroller that stores system operation information, a PNH cloud-side transceiver networked to the cloud of servers for receiving the system operation information updates from the server, and a PNH LAN Long range transceiver that communicates via a long range spread spectrum (SS) signal or a narrowband frequency shift keying (FSK) signal. The PD includes a PD microcontroller, a PD LAN transceiver, and an actuation mechanism. The system operation information stored at the PNH includes actuation instruction for the PD.

A method is also disclosed. The method includes receiving and storing a system operation instruction at a PNH of a stand-alone LAN. The PNH includes a Long range transceiver and a cloud-side transceiver networked to a server that is part of a cloud of servers. The method also includes receiving, at the PNH cloud-side transceiver and from the server, update information for the system operation instruction, and associating the system operation instruction and the update information with a peripheral device (PD) of the stand-alone LAN. The PD includes a Long range transceiver and an actuation mechanism, and is located remotely from the PNH within the stand-alone LAN. The method also includes transmitting, via the PNH Long range transceiver, actuation instructions for the PD based on the system operation instruction and the update information.

Another method is disclosed, which includes receiving and storing a system operation instruction at a PNH of a stand-alone LAN. The PNH includes a long range transceiver and a cloud-side transceiver networked to a server that is part of a cloud of servers. The method further includes receiving, at the PNH cloud-side transceiver and from the server, update information for the system operation instruction, storing, at the PNH, the update information, and associating the system operation instruction and the update information with a secondary network hub (SNH) of the stand-alone LAN. The SNH includes a Long range transceiver, and is located remotely from the PNH within the stand-alone LAN. The method also includes transmitting, via the PNH Long range transceiver, the system operation instruction and the update information, associating the system operation instruction and the update information with a peripheral device (PD) having a Long range transceiver and an actuation mechanism, and located remotely from the SNH and the PNH, and transmitting, via the SNH Long range transceiver, actuation instructions for the PD based on the system operation instruction and the update information.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

Figure 1:
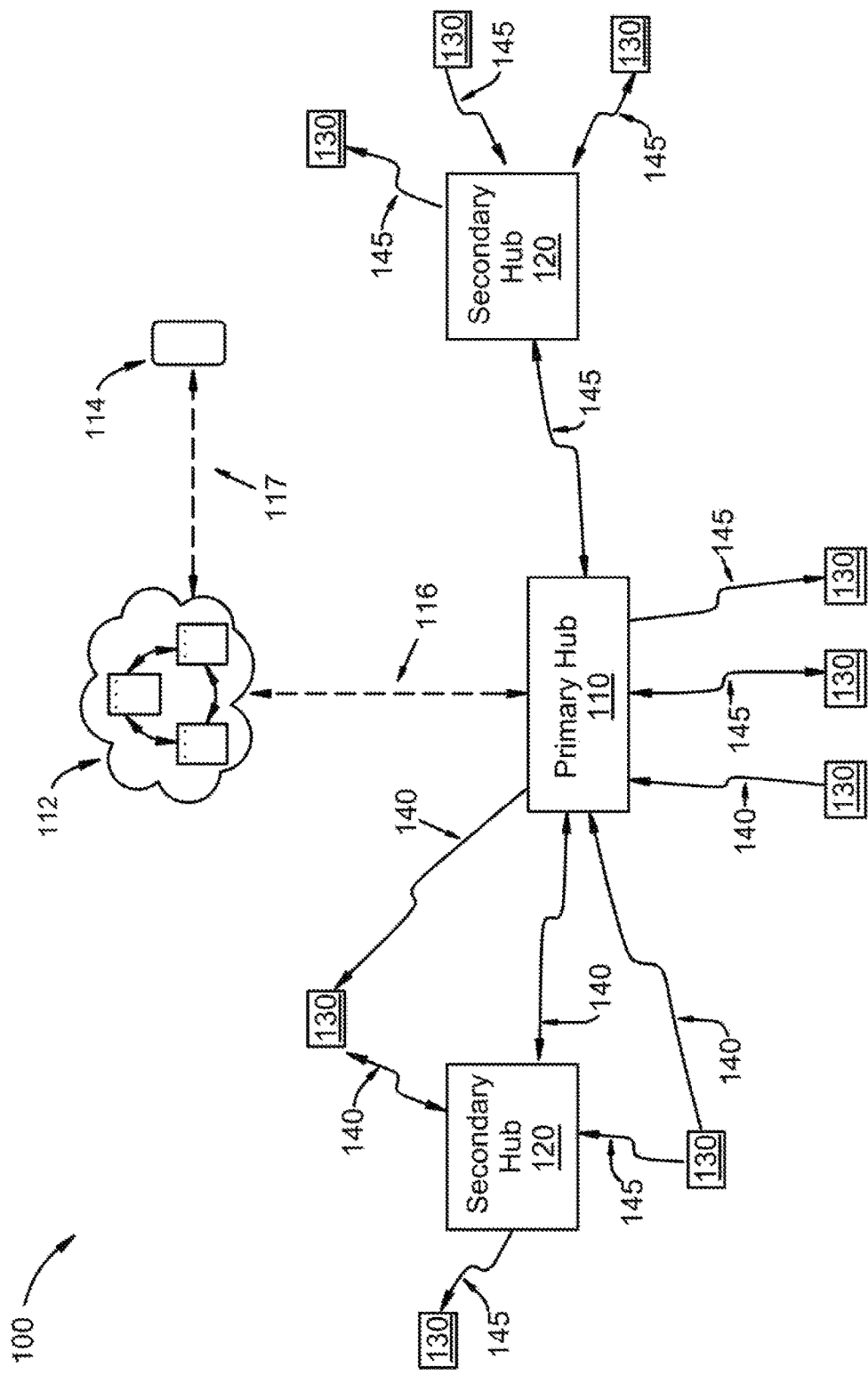
FIG. 1 depicts one embodiment of a cloud-networked dual modulation network.

A detailed description of the churned invention is provided below by example, with reference to embodiments in the appended figures. Those of skill in the art will recognize that the components of the invention as described by example in the figures below could be arranged and designed in a wide variety of different configurations, including combinations of embodiments described below or other embodiments not described. Thus, the detailed description of the embodiments in the figures is merely representative of embodiments of the invention, and is not intended to limit the scope of the invention as claimed.

In some instances, features represented by numerical values, such as dimensions, mass, quantities, and other properties that can be represented numerically, are stated as approximations. Unless otherwise stated, an approximate value means "correct to within 50% of the stated value." Thus, a length of approximately 1 inch should be read "1 inch+/−0.5 inch."

All or part of the present invention may be embodied as a system, method, and/or computer program product. The computer program product may include a computer readable storage medium (or media) having computer readable program instructions thereon for causing a processor to carry out aspects of the present invention. For example, the computer program product may include firmware programmed on a microcontroller.

The computer readable storage medium may be a tangible device that can retain and store instructions for use by an instruction execution device. The computer readable storage medium may be, for example, but is not limited to, an electronic storage device, a magnetic-storage device, an optical storage device, an electromagnetic storage device, a semiconductor storage device, a chemical memory storage device, a quantum state storage device, or any suitable combination of the foregoing. A non-exhaustive list of more specific examples of the computer readable storage medium includes the following: a portable computer diskette, a hard disk, a random access memory (RAM), a read-only memory (ROM) an erasable programmable read-only memory (EPROM or Mash memory), a static random access mentors (SRAM), a portable compact disc read-only memory (CD-ROM), a digital versatile disk (DVD) a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming languages such as Smalltalk C++ or the like, and conventional procedural programming languages such as the "C" programming language or similar programming languages. Computer program code for implementing the invention may also be written in a low-level programming language such as assembly language.

In some embodiments, electronic circuitry including, for example, programmable logic circuitry, field-programmable gate arrays (FPGA), or programmable logic arras (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. Those of skill in the art will understand that each block of the flowchart illustrations and/or block diagrams, and combinations of blocks in the flowchart illustrations and/or block diagrams, may be implemented by computer readable program instructions. Additionally, those of skill in the art will recognize that the system blocks and method flowcharts, though depicted in a certain order, may be organized in a different order and/or configuration without departing from the substance of the claimed invention.

These computer readable program instructions may be provided to a processor of a general purpose computer, special purpose computer, embedded system, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process such that the instructions which execute on the computer, other programmable apparatus, or other device implement the functions/acts specified in the flowchart and/or block diagram block or blocks.

FIG. 1 depicts one embodiment of a cloud-networked dual modulation network 100 according to the claimed invention. Network 100 includes primary network hub (PNH) 110 networked to at least one server that is part of a cloud of servers 112. The cloud of servers 112 pushes updates to PNH 110 received from a user device 114. PNH 110 is networked to cloud of servers 112 via wired connection 116, and user device 114 is networked to cloud of servers 112 via wireless network 117. Wired connection 116 is any of a variety of wired connections such as, for example, Ethernet. However, in some embodiments, PNH 110 is wirelessly networked to cloud of servers 112, such as via a wifi network. Wireless network 117 is any of a variety of wireless networks, such as 3G or 4G. In some embodiments, wireless network 117 is a wifi network.

Network 100 additionally includes one or more secondary network hubs (SNH) 120 located remotely from PNH 110 within a PNH-SNH transmit-receive range, and one or more PDs 130. The PDs 130 are located remotely from the PNH 110 and the SNH 120 within at least one of a PNH-PD transmit-receive range or a SNH-PD transmit-receive range. PNH 110 has one or more Long range transceivers and one or more microcontrollers having communication firmware for long range spread spectrum (SS) and narrowband frequency shift keying (FSK) signal communication via the PNH Long range transceiver. SNH 120 similarly has one or more Long range transceivers and one or more microcontrollers having communication firmware for long range SS and narrowband FSK signal communication via the SNH Long range transceiver. PD 130 also has, in one embodiment of dual modulation network 100, an actuation mechanism, at least one Long range transceiver and at least one corresponding microcontroller having communication firmware for long range SS and narrowband FSK signal communication via the PD 130 Long range transceiver. In another embodiment, PD 130 has an actuation mechanism, at least one receiver and at least one corresponding microcontroller having receive firmware for long range SS and narrowband FSK signal communication. In yet another embodiment, PD 130 has an actuation mechanism, at least one transmitter and at least on corresponding microcontroller having transmit firmware for long range SS and narrow band FSK signal communication.

As used throughout the claims and specification, long range means any range from 0.5 to 30 miles. In some embodiments, long range means approximately 1 mile. In other embodiments, long range means ranging from 1 to 26 miles. In yet other embodiments, long range means approximately 10 miles.

PNH 110, SNH 120, and/or PD 130 communicate via long range SS signals 140 and/or narrowband FSK signals 145 based on a range between communicating devices. For example, in one embodiment, PNH 110 communicates with one PD 130 via long range SS signals 140 and with a second PD 130 via narrowband FSK signals 145. In such an example, this configuration would be particularly beneficial where the first PD 130 is outside a PNH-PD narrowband FSK communication range but within a PNH-PD long range SS communication range. In another embodiment, a PD 130 is mobile. PNH 110 communicates with PD 130 via narrowband FSK signals 145 when PD 130 is within the PNH-PD narrowband FSK range, and via long range SS signals 140 when PD 130 is outside the PNH-PD narrowband FSK range. In another embodiment, PNH 110 communicates with PD 130 via long range SS signals 140 even when PD 130 is within the PNH-PD narrowband FSK range.

Many PDs are controlled by instructions consisting of hundreds of bits to hundreds of kilobits of data. Such instructions thus do not need to be communicated over high-data rate networks, thus decreasing the power consumed in transmitting and receiving information. Rather, low-data instructions can be transmitted via a low-data rate signal while still having a last response time, such as within one second. This is particularly important for battery-operated PDs. PD 130 is, in some embodiments, such a PD, where PD 130 is battery-operated and is controlled by instructions consisting of hundreds of bits to hundreds of thousands of bits. In one embodiment, PD 130 requires from 100 bits to 500 kilobits of data for instruction. In this embodiment, long range SS signals 140 communicate instructions to PD 130 at a rate from 100 bits per second (bps) to 500 kilobits per second (kbps). In another embodiment, PD 130 requires from 200 bits to 300 kilobits of data for instruction. In this other embodiment, long range SS signals 140 communicate instructions to PD 130 at a rate from 200 bps to 300 kbps. In yet another embodiment, PD 130 requires from 1 to 100 kilobits of data for instruction. In this embodiment, long range SS signals 140 communicate instructions to PD 130 at a rate from 1 to 100 kbps.

In one example, PNH 110 communicates with SNH 120 via long range SS signals 140. SNH 120 processes communications from PNH 110 and forwards information to PD 130 via narrowband FSK signals 145. Similarly, in another embodiment, SNH 120 receives information from PNH 110 via narrowband FSK signals 145, processes the information, and forwards information to PD 130 via long range SS signals 140. As another example, communication between PNH 110, SNH 120 and PD 130 is accomplished via solely long range SS signals 140 or solely narrowband FSK signals 145.

Long range SS signals 140 are any time of spread spectrum signal. For example, in one embodiment, long range SS signals 140 are long range spread spectrum frequency hopping (SSFH) signals. In another embodiment, long range SS signals 140 are long range direct-sequence spread spectrum (DSSS), time-hopping spread spectrum (THSS), or chirp spread spectrum (CSS) signals. Other embodiments include combinations of two or more of SSFH, DSSS, THSS, and/or CSS signals. In embodiments comprising SSFH, DSSS, THSS, and/or CSS signals, the microcontrollers described above include firmware having instructions for communicating using these signals. For example, in one embodiment, the PNH microcontroller firmware includes instructions for long range SSFH signal communication. In the same or another embodiment, the SNH microcontroller firmware similarly includes instructions for long range SSFH signal communication. Additionally, in the same or other embodiments, the PD microcontroller firmware includes instructions for long range SSFH signal communication. In one embodiment, the microcontroller firmware of the PNH, SNH and PD all include instructions for long range SSFH signal communication.

In one embodiment, each SNH 120 is associated with a particular group of PDs 130, where each PD 130 is associated with only one SNH 120. PNH 110 stores high-level system operation information and instructions. The system operation information and instructions include operation instructions for SNHs 120 and PDs 130, and information about which PD 130 is associated with which SNH 120. PNH 110 transmits operation information and instructions to each SNH 120 for that hub only and its associated PDs. SNH 120 stores the operation information and instructions sent by PNH 110 and transmits and/or receives information, including instructions, to and/or from its associated PDs 130. Thus, PNH 110 acts as a system-wide control hub, and SNHs 120 act as local control hubs. This embodiment allows for robust communication with many devices while avoiding the interference and lag time of a single-hub system.

PD 130 may be any of a variety of apparatuses that include an actuation mechanism. In one embodiment, PD 130 is a gate for an access-controlled enclosure. For example, the enclosure, in one embodiment, is a perimeter fence surrounding a property such as a business, home, industrial complex, prison, or other access-controlled enclosures. In another embodiment, PD 130 is a door for allowing access to a structure or room within a structure. In one embodiment, PD 130 is a climate-control device, such as an HVAC system, for adjusting heating and cooling output inside a building. In yet another embodiment, PD 130 is an automated blind system and/or a light switch and/or system of light switches. PD 130 is also, in some embodiments, any of various household appliances, such as a refrigerator, stove, oven, dishwasher, clothes washing machine, clothes dryer, toilet, bath and/or shower, and kitchen appliances. In other embodiments, PD 130 is a personal computer, a printer/scanner, a fax machine and/or a telephone.

PD 130 is also, in some embodiments, any of a variety of commercial and/or industrial equipment. For example, in one embodiment, PD 130 is an elevator. In another embodiment, PD 130 is one of a variety of manufacturing equipment, such as a conveyor belt, a pump, a sensor, a motor, and/or a 3D printer. In yet other embodiments, PD 130 is a vehicle and/or a vehicle component such as a starter or a motor. In one embodiment, PD 130 is a drone.

Dual modulation network 100 is a stand-alone network that offers several benefits. First, dual modulation network 100 operates independently of the Internet. Thus. PNH 110 can communicate with each SNH 120 and PD 130 even when the external Internet connection is down. Additionally, in some embodiments of dual modulation network 100, PNH 110, SNHs 120 and PDs 130 are equipped with backup power. The backup power is, in some embodiments, local, such as a battery. In the same or other embodiments, the backup powder is an off-grid power source such as a generator or batteries. In such embodiments, connectivity between PNH 110, SNHs 120 and PDs 130, and operability of each, continues through a grid-power outage.

An additional benefit of the stand-alone dual modulation network described above is inherent security. In order for a device to interpret a long range SS signal, it must know which frequencies to check. In dual modulation network 100, each of PNH 110, SNHs 120 and PDs 130 are programmed with a unique frequency sequence for dual modulation network 100. Eternal observers not aware of the unique frequency sequence would interpret the signals from dual modulation network 100 as noise, even if the observer were frying to intercept signals from dual modulation network 100. For added security, PNH 110, SNHs 120 and PDs 130 include, in some embodiments, tamper firmware that notifies an authorized user that the device has been tampered with before an unauthorized user can obtain the frequency sequence, automatically changes the frequency sequence, and updates other devices on the network with the new frequency sequence. For example, PNH 110 receives a tamper signal from PD 130. PNH 110 changes the frequency sequence and updates SNHs 120 and other PDs 130 with the new sequence. PNH 110 then notifies an authorized user that PD 130 has been tampered with and the frequency sequence has been updated.

The foregoing PD 130 embodiments described are examples only, and are not to be construed as limiting the scope of PD 130. Rather, PD 130 is any device or system that includes an actuation mechanism that performs a tangible function, such as turning a light in a room on or off, unlocking and/or opening a gate, and opening and/or closing blinds.

Figure 2:
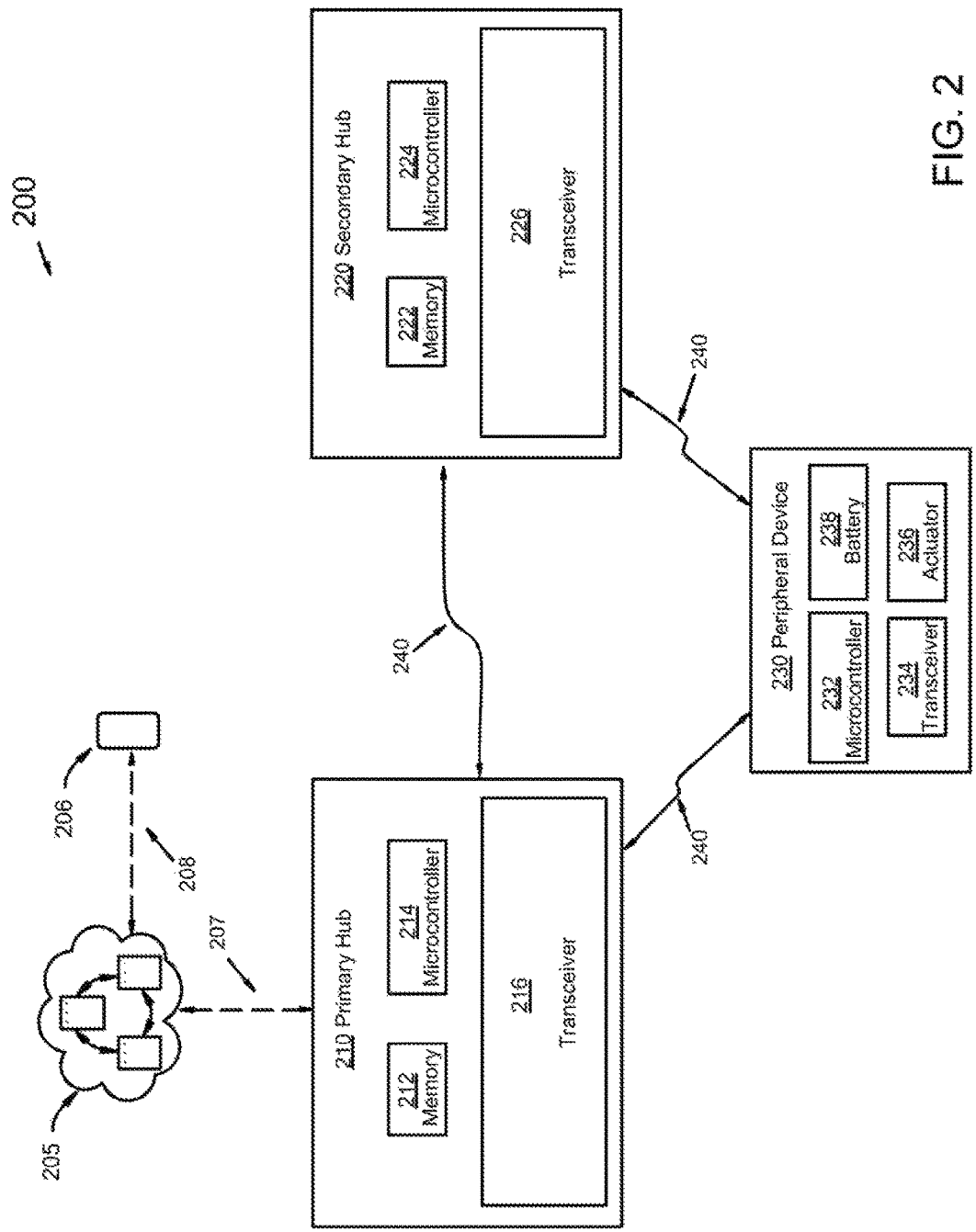
FIG. 2 depicts another cloud-networked dual modulation network.

FIG. 2 depicts another cloud-networked dual modulation network. Network 200 includes PNH 210 networked to at least one server that is part of cloud of servers 205. Cloud of servers 205 pushes updates to PNH 210 received from user device 206. PNH 210 is networked to cloud of servers 205 via wired connection 207, and user device 206 is networked to cloud of servers 205 via wireless network 208.

PNH 210 includes memory 212, microcontroller 214, and transceiver 216. Similarly, SNH 220 includes memory 222, microcontroller 224, and transceiver 226. PD 230 includes microcontroller 232, transceiver 234, actuator 236, and battery 238. PNH 210, SNH 220 and PD 230 communicate via wireless signals 240. Wireless signals 240 are any type of wireless signal. For example, in one embodiment, wireless signals 240 are long range SS signals such as SSFH, DSSS, THSS and/or CSS on the 900 MHz ISM band, or narrowband FSK signals on the 900 MHz ISM band. PD microcontroller 232 includes communication firmware having instructions for long range SS signal communication, narrowband FSK signal communication, or both. In a specific embodiment, the PD communication firmware includes instruction for long range SSFH signal communication. Similarly, SNH microcontroller 224 has communication firmware for long range SS and narrowband FSK signal communication via transceiver 226. In a specific embodiment, the SNH communication firmware includes instructions for long range SSFH signal communication. Additionally, in some embodiments, similar to PD 230, SNH 120 includes a battery for off-power grid operation.

PD 230 is any one of the various devices described above with regard to PD 130 in FIG. 1. Memories 212 and 222 are any of a variety of non-volatile memory devices such as ROM, flash, hard disk, and/or optical disk. Similarly, microcontrollers 214, 224 and 232 are, in some embodiments, any of a variety of of-the-shelf microcontrollers. Transceivers 216, 226 and 234 are also, in some embodiments, any of a variety of off-the-shelf 900 MHz ISM band transceivers. For example, in various embodiments, one or more of transceiver 216, 226 and 234 are Long range transceivers.

Microcontroller 214 and transceiver 212 are, in some examples, networked via a printed circuit board (PCB). However, in some embodiments, microcontroller 214 and transceiver 216 are networked in a network-on-chip (NoC) architecture. Similarly, in some embodiments, microcontroller 224 and transceiver 226 are networked via PCB, whereas in some other embodiments, microcontroller 224 and transceiver 226 are networked m a NoC architecture. Additionally, in some embodiments, microcontroller 232 and transceiver 234 are networked via PCB, whereas in other examples microcontroller 232 and transceiver 234 are networked in a NoC architecture.

Memory 212 is networked to microcontroller 214 and transceiver 216. Similarly, memory 222 is networked to microcontroller 224 and transceiver 226. This networking may be accomplished by any of a variety of means, such as via PCB, ribbon cable, NoC architecture, or a combination thereof. Thus, in some embodiments, memory 212 and microcontroller 214 are networked via PCB, ribbon cable, NoC architecture, or a combination thereof. Similarly, in some embodiments, memory 222 and microcontroller 224 are networked via PCB, ribbon cable, NoC architecture, or a combination thereof.

PNH 210, SNH 220 and PD 230 may be powered by any of a variety of means. For example, as depicted, PD 230 includes a battery in some embodiments. However, in other embodiments, PD 230 is powered via a standard electrical outlet or another external power source. PNH 210 and SNH 220 are powered via standard electrical outlets or another external power source in some embodiments, but also include, in such and other embodiments, backup batteries in case of power failure. In some embodiments, PD 230 also includes a backup battery in case battery 238 fails.

Figure 3:
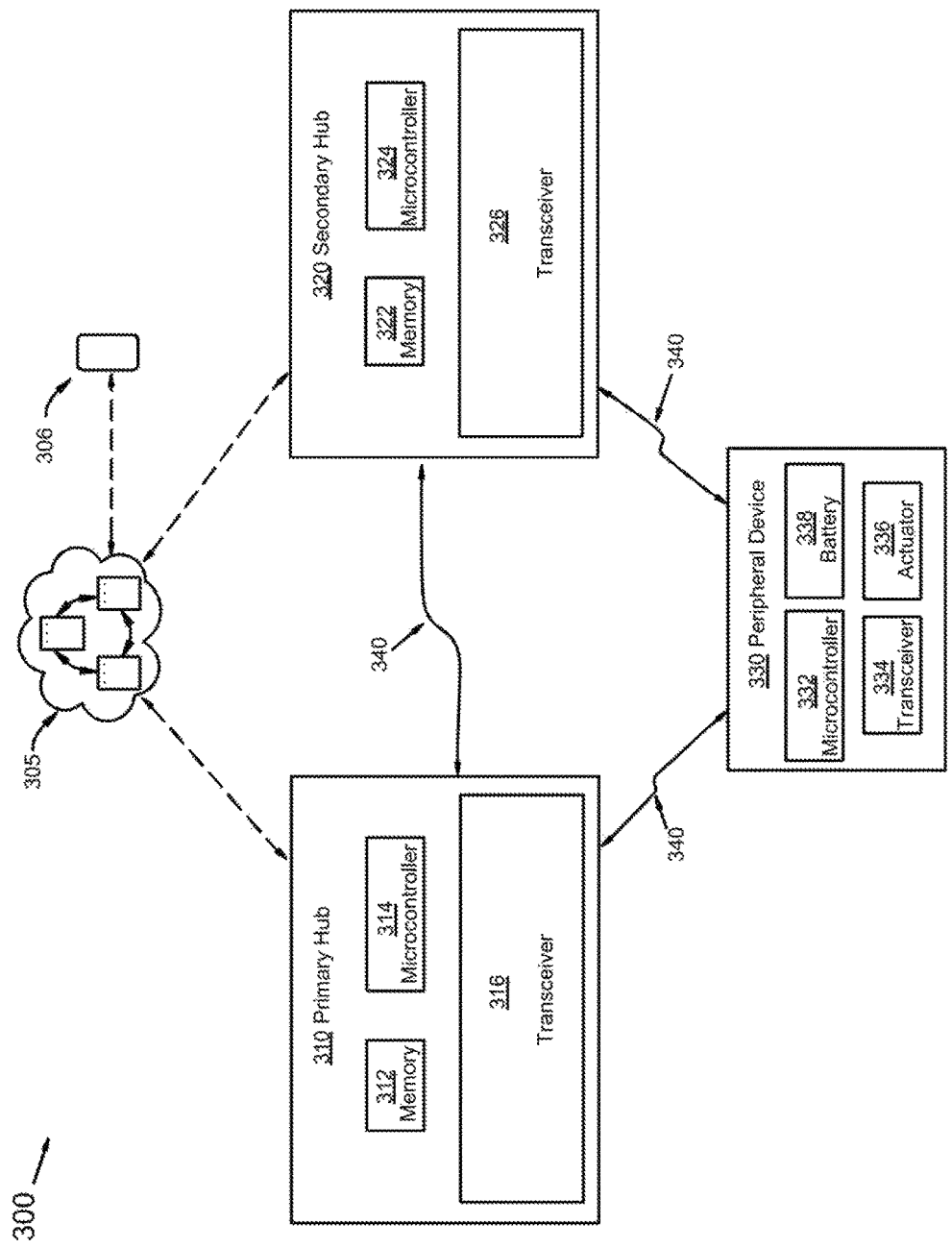
FIG. 3 depicts another cloud-networked dual modulation network.

FIG. 3 depicts another cloud-networked dual modulation network. Network 200 includes PNH 310 and SNH 320, both of which are networked to at least one server that is part of cloud of servers 305. Cloud of servers 305 pushes updates to PNH 310 and SNH 320 received from a user device 306. PNH 310 and SNH 320 are, in some embodiments, networked to cloud of servers 305 via a wired connection, and in other embodiments are networked to cloud of servers 305 via wireless connection. In some embodiments, PNH 310 and SNH 320 share a network connection to cloud of servers 305. In other embodiments, PNH 316 and SNH 320 are independently networked to cloud of servers 305. For example, in one embodiment, PNH 310 is networked to cloud of servers 305 via a wired connection, and SNH 320 is networked to cloud of servers 305 via a wireless network.

PNH 310 includes memory 312, microcontroller 314, and transceiver 316. Similarly, SNH 320 includes memory 322, microcontroller 324, and transceiver 326. PD 330 includes microcontroller 332, transceiver 334, actuator 336, and battery 338. PNH 310, SNH 320 and PD 330 communicate via wireless signals 340.

In some embodiments, microcontroller 314 is programmed with transceiver firmware and includes a clock signal. The transceiver firmware comprises long range SS and narrowband FSK signal communication instructions. For example, in one embodiment, the transceiver firmware comprises instructions for long range spread spectrum frequency hopping signal communication. Similarly, in some embodiments, microcontroller 324 is programmed with transceiver firmware, location firmware 354, and includes a clock signal. The SNH clock signal is synchronized with the PNH clock signal. The location firmware instructs transceiver 326 to transmit a location signal encoded with a transmit time stamp from the SNH clock signal. The location signal notifies a receiving device of the time, which is associated with the SNH clock signal, SNH 320 transmitted the location signal. For example, in one embodiment, the receiving device is PNH 310. Because the PNH 310 and SNH 320 clock signals are synchronized, PNH 310 can determine a time of flight for the signal and determine the distance from PNH 310 to SNH 320. In some embodiments, microcontroller 320 is programmed to choose, based at least in part on the distance from PNH 310 to SNH 340, a long range SS signal or narrow band FSK signal. For example, in one embodiment, PNH 310 determines the distance to SNH 320 is 20 meters, and chooses the narrowband FSK signal for communication between PNH 310 and SNH 320. In another embodiment, PNH 310 determined the distance to SNH 320 is 1 mile, and chooses the long range SS signal for communication between PNH 310 and SNH 320.

In some embodiments, microcontroller 332 is programmed with communication firmware, location firmware, actuation firmware, and includes a clock signal. The clock signal is synchronized with the PNH clock signal. The PD location firmware instructs transceiver 334 to transmit a location signal encoded with a transmit time stamp from the PD clock signal. The location signal notifies a receiving device of the time, which is associated with the PD clock signal, PD 330 transmitted the location signal. For example, in one embodiment, the receiving device is PNH 310. Because the PNH 310 and PD 330 clock signals are synchronized. PNH 310 can determine a time of flight for the signal and determine the distance from PNH 310 to PD 330 and choose an appropriate signal for communication between PNH 310 and PD 330.

Figure 4:
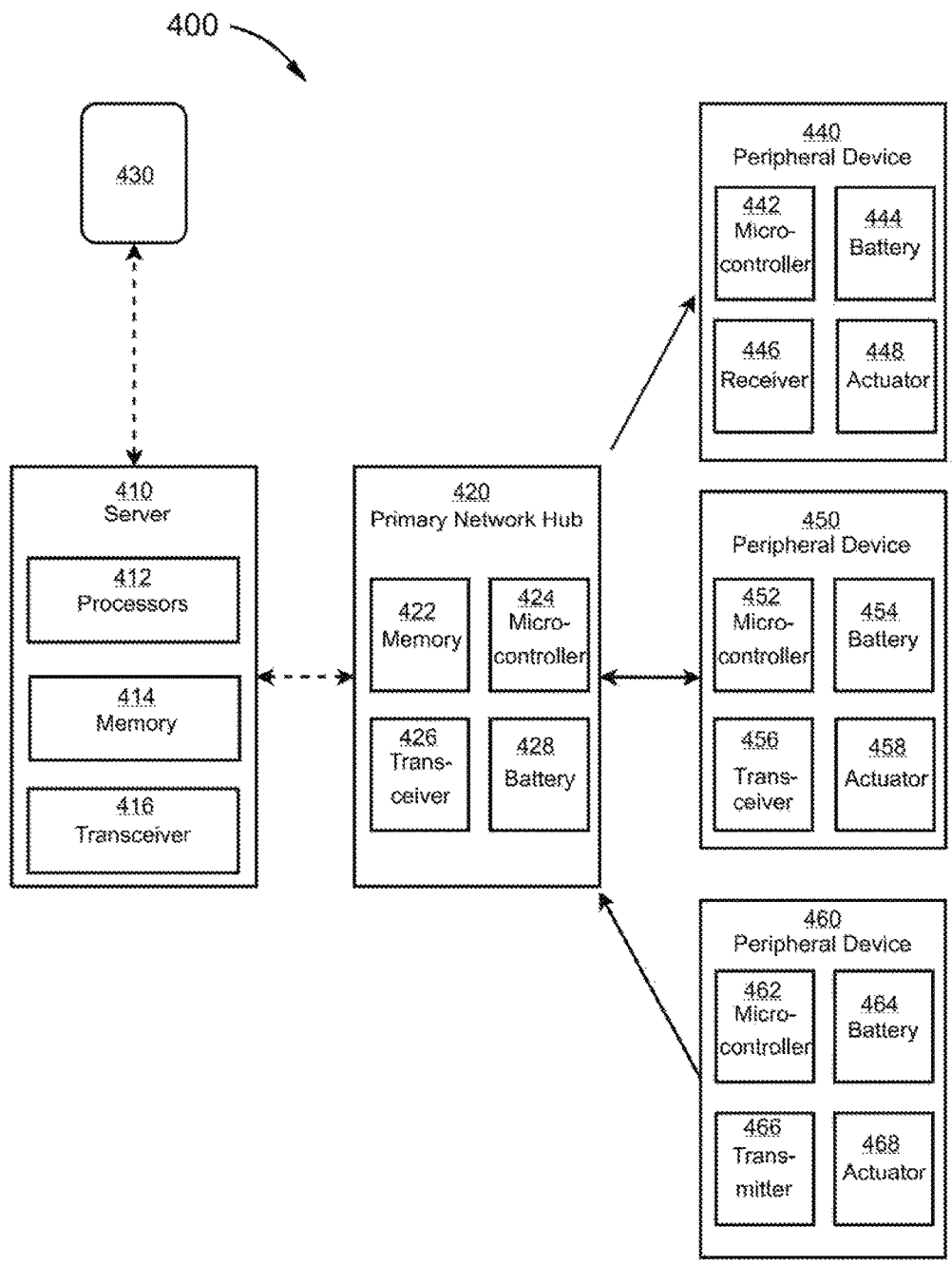
FIG. 4 depicts one embodiment of a single-hub, cloud-networked stand-alone LAN.

FIG. 4 depicts one embodiment of a single-hub cloud-networked stand-alone LAN. Network 400 includes Server 410 having processors 412, memory 414, and transceiver 410. Server 410 is part of n cloud of servers networked through the Internet, and can be a data server, an application server, or both. Server 410 is networked to PNH 420 and user device 430. User device 430 sends system operation information updates from a user to PNH 420 via server 410. However, in softie embodiments, user device 430 sends system operation information updates directly to PNH 420 or other devices in the stand-alone LAN. In such embodiments, user device 430 includes a long range transceiver that communicates via a long range SS signal or a narrowband FSK signal.

PNH 420 includes memory 422, microcontroller 424, transceiver 426, and battery 428. In some embodiments, battery 428 is a back-up battery. In such embodiments, PNH 420 receives its primary power supply externally, such as from a standard 120V outlet. Batter 428 is charged, in some embodiments, by PNH's 420 power supply, and powers PNH 420 when the external power supply fails. However, in some embodiments, battery 428 is PNH's 420 primary power supply. In some such embodiments, PNH 420 includes one or more back-up batteries in case battery 428 dies or otherwise fails.

Network 400 additionally includes receive-only PD 440, transmit-receive PD 450, and transmit-only PD 460. Each PD 440, 450, 460 includes microcontroller 442, 452, 462, battery 444, 454, 464, and actuator 448, respectively. PD 440 includes receiver 446. For example, in one embodiment, PD 440 is window blinds that receive an actuation signal from PNH 420 without need for a response signal. In such an embodiment, PNH 420 is pre-programmed with PD 440's location so it uses the appropriate signal to communicate with PD 440. In another embodiment, PD 440 is an alarm that sounds audibly upon a notification from PNH 420. For example, in a specific embodiment, PNH 420 receives a tornado warning from server 410 and transmits an alarm notification to PD 440, which sounds an alarm in response to receiving the notification without need for sending a response signal.

PD 450 includes transceiver 456. For example, in one embodiment, PD 450 is an access pad for a door to an access controlled room. PD 450 receives, from PNH 420, system operation information that includes authorized access pins. When an authorized access pin is entered into PD 450, PD 450 allows access to the room and sends a signal notifying PNH 420 that the access pin was used. The notification includes, in some embodiments, date and time information. In another embodiment, user device 430 sends to server 410 information updating an authorized access pin to be unauthorized. Server 410 pushes the update to PNH 420, which stores the update and transmits the update to PD 450. When the unauthorized pin is entered into PD 450, PD 450 denies access to the room and sends a notification to PNH 420 that the unauthorized access pin was used. In some cases, PNH 420 forwards that information to user device 430.

PD 460 includes transmitter 466. For example, in one embodiment, PD 460 is a window. When PD 460 is opened, PD 460 transmits a status change notification to PNH 420. In some cases, PNH 420 forwards the status change notification to user device 430.

Figure 5:
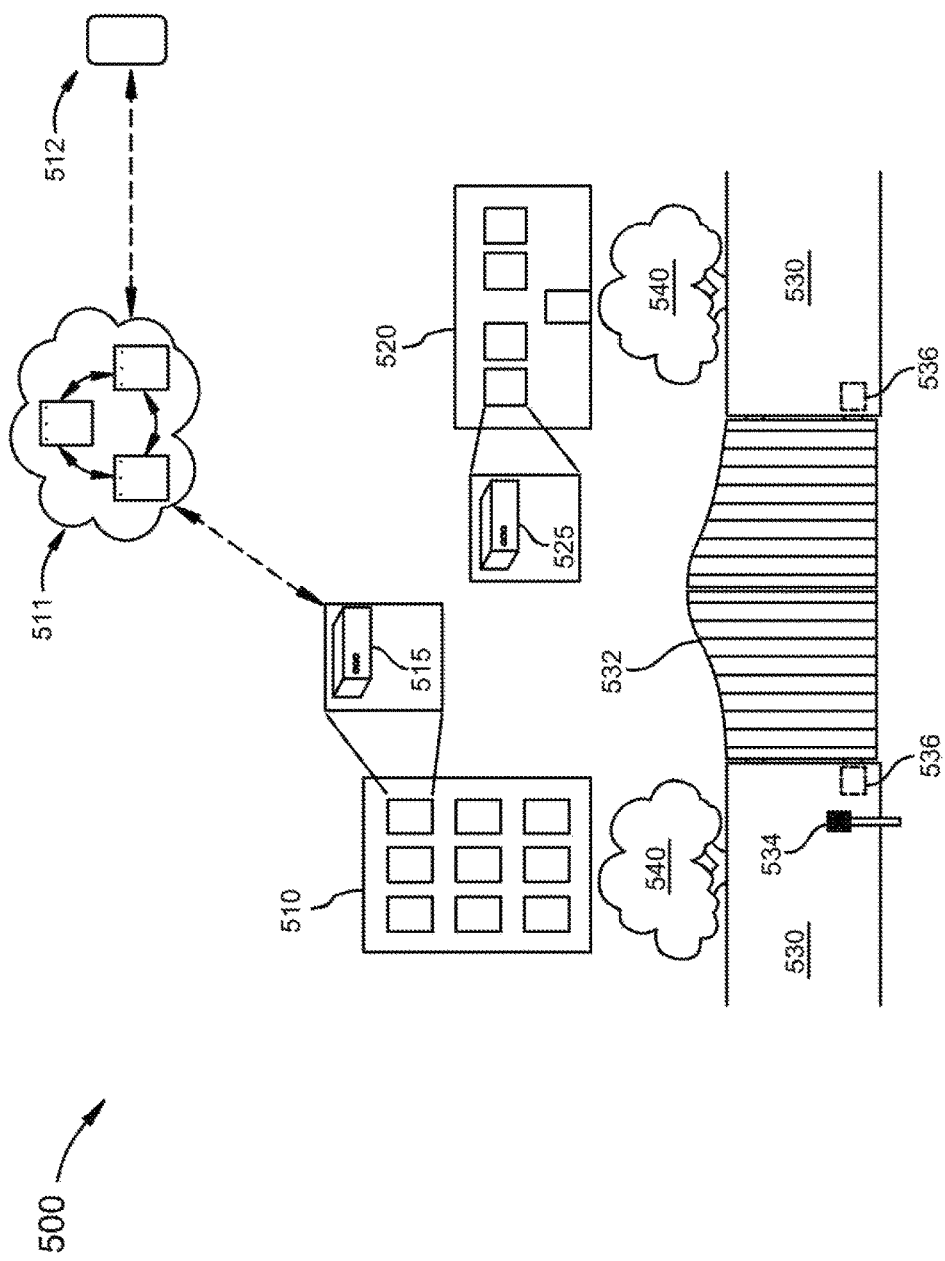
FIG. 5 depicts a specific embodiment of a multi-hub, cloud-networked stand-alone LAN.

FIG. 5 depicts a specific embodiment of a multi-hub, cloud-networked stand-alone LAN such as a network for an access-controlled multi-building industrial complex. Industrial complex 500 includes building 510, which houses PNH 515, and building 520, which houses SNH 525. PNH 515 is networked to cloud of servers 511, which receives and sends information between PNH 515 and user device 512.

Industrial complex 500 is surrounded by perimeter fence 530. Perimeter fence 530 includes a PD which controls access to industrial complex 500. In the present embodiment, the PD is entry gate 532, and the PD actuation mechanism includes access pad 534 and a gate actuator such as gate motors 536. Access pad 534 is located remotely from gate motors 536, and access pad 534 includes a Long range transceiver and microcontroller as described for PDs above. Between each of PNH 515, SNH 525, and access pad 534 are obstructions 540. Obstructions 540 include, in some embodiments, any structure that impedes and/or interferes with RF signal transmission, such as walls and/or buildings. In some embodiments, obstructions 540 include landscape features, such as trees, bushes, hills, rocks, etc., that impedes and/or interferes with RF signal transmission. Obstructions 540 also include, in some embodiments, other RF signals that interfere with RF signal transmission.

A multi-hub dual modulation network is useful for centralizing control of many devices located remotely around an industrial complex. In the depicted example, PNH 515 stores system operation information for all locally networked devices around industrial complex 500. PNH 515 communicates local system operation information for PDs in and/or around building 520 to SNH 525, SNH 525 stores the local system operation information and communicates directly with PDs in and/or around building 520. The system operation information also includes local system operation information for PDs in and/or around building 510. PNH 515 communicates directly with PDs in and/or around building 510. The system operation information also includes system operation information for PDs located remotely from building 510 and building 520 around industrial complex 500, such as access pad 534. PNH 515 communicates directly with such PDs in some embodiments, or may assign such PDs to SNH 525 for operational control.

One example of system operation information is access permission to industrial complex 500, PNH 515 receives and stores pin numbers associated with authorized users of gate 532. In one embodiment, a user inputs a pin into access pad 534. Access pad 534 transmits to PNH 515 via, for example, a long range SS signal, the access pin entered by the user and a gate 532 identifier. PNH 515 receives the pin and gate 532 identifier and compares those to the stored pin numbers associated with authorized users of gate 532. If the entered pin and gate 532 identifier match a pin associated with a user of gate 532, PNH 515 transmits a signal to motors 536 to open gate 532. If the entered pin and gate 532 identifier do not match a pin associated with a user of gate 532, no response is sent, or a signal notifying the user access is denied is sent to access pad 534. In an alternative embodiment, PNH 515 transmits a signal to access pad 534 to open gate 532, which signal is relayed by access pad 534 to motors 536.

Another example includes PNH 515 receiving and storing pin numbers associated with authored users of gate 532, and transmitting that data to access pad 534. Access pad 534 receives and stores the pin numbers associated with authorized users of gate 532. A user enters a pin into access pad 534, and access pad 534 compares the entered pin to the stored pin numbers associated with authorized users of gate 532. If the pin matches an authorized pin, access pad 534 sends a signal to motors 536 to open gate 532. Otherwise, no signal is sent, and in some embodiments, access pad 534 notifies the user that access is denied.

Figure 6:
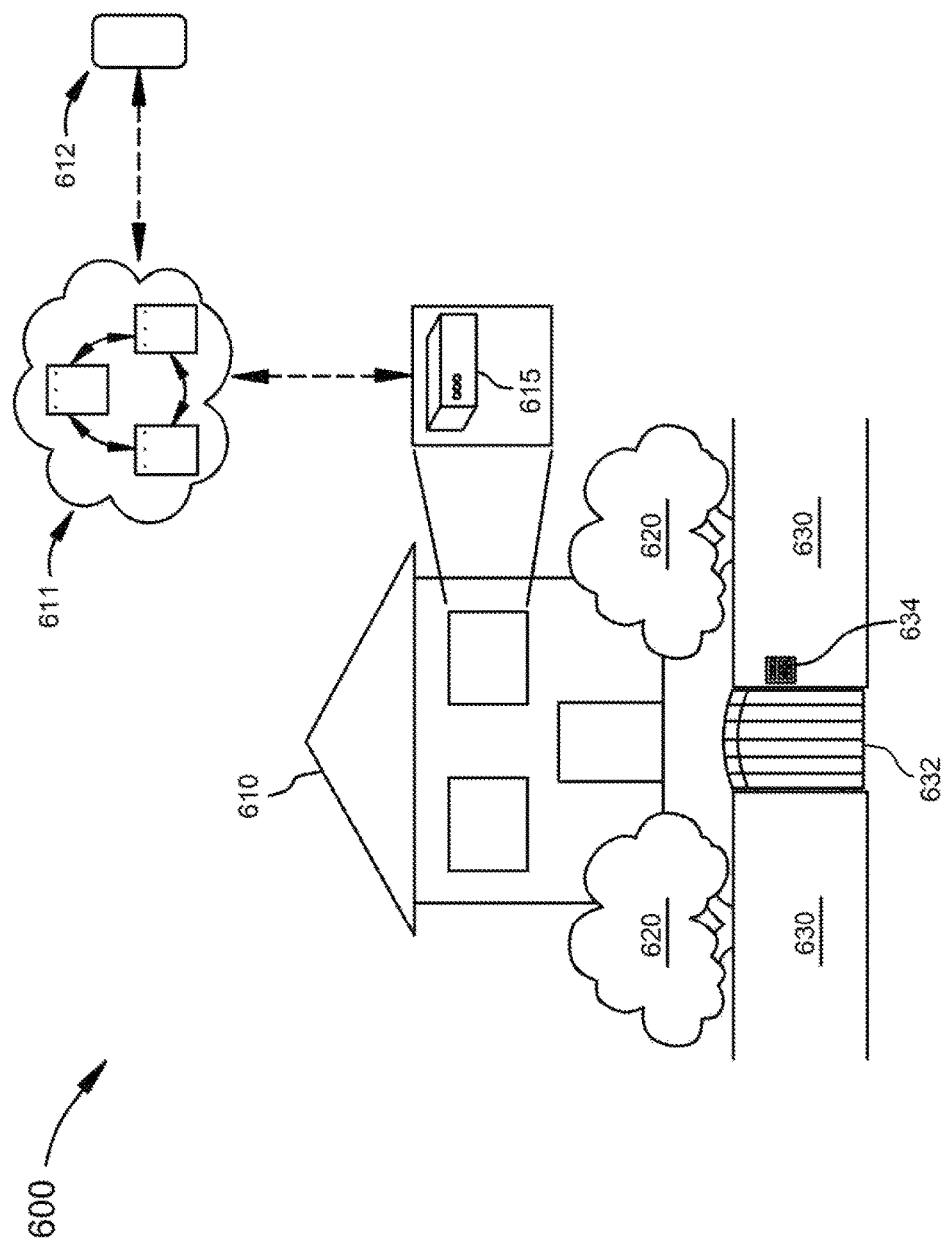
FIG. 6 depicts a specific embodiment of a single-hub cloud-networked stand-alone LAN.

FIG. 6 depicts a specific embodiment of a single-hub cloud-networked stand-alone LAN such as a network for a residential home. Residential home 600 includes house 610, which houses PNH 615. PNH 625 is networked to cloud of servers 611, which receives and sends information between PNH 615 and user device 612.

Residential home 600 is surrounded by perimeter fence 630. Perimeter fence 630 includes a PD which controls access to residential home 600. In the present embodiment, the PD is an entry gate 632, and the PD actuation mechanism includes an access pad 634. Access pad 1134 includes a Long range transceiver and microcontroller as described for PDs above. Between PNH 615 and access pad 634 are obstructions 620. Obstructions 620 include, in some embodiments, any structure that impedes and/or interferes with RF signal transmission, such as walls and/or buildings. In some embodiments, obstructions 620 include landscape features, such as trees, bushes, hills, rocks, etc., that impede and/or interfere with RF signal transmission. Obstructions 620 also include, in some embodiments, other RF signals that interfere with RF signal transmission.

A single-hub dual modulation network is useful for centralizing control of many devices located remotely around a residential home. In the depicted example, PNH 615 stores system operation information for all locally networked PDs around residential home 600, such as access pad 634. PNH 615 communicates directly with such PDs.

One example of system operation information is access permission to residential home 600. PNH 615 receives and stores pin numbers associated with authorized users of gate 632. In one embodiment, a user inputs a pin into access pad 634. Access pad 634 transmits to PNH 615 via, for example, a long range SS signal, the access pin entered by the user and a gate 632 identifier. PNH 615 receives the pin and gate 632 identifier and compares those to the stored pin numbers associated with authorized users of gate 632. If the entered pin and gate 632 identifier match a pin associated with a user of gate 633, PNH 615 transmits a signal to access pad 634 to unlock gate 632. If the entered pin and gate 632 identifier do not match a pin associated with a user of gate 1132, no response is sent, or a signal notifying the user access is denied is sent to access pad 634.

Another example includes PNH 615 receiving and storing pin numbers associated with authorized users of gate 632, and transmitting that data to access pad 634. Access pad 634 receives and stores the pin numbers associated with authorized users of gate 632. A user enters a pin into access pad 634, and access pad 634 compares the entered pin to the stored pin numbers associated with authorized users of gate 632. If the pin matches an authorized pin, access pad 634 unlocks gate 1132. Otherwise, no signal is sent, and in some embodiments, access pad 634 notifies the user that access is denied.

Figure 7:
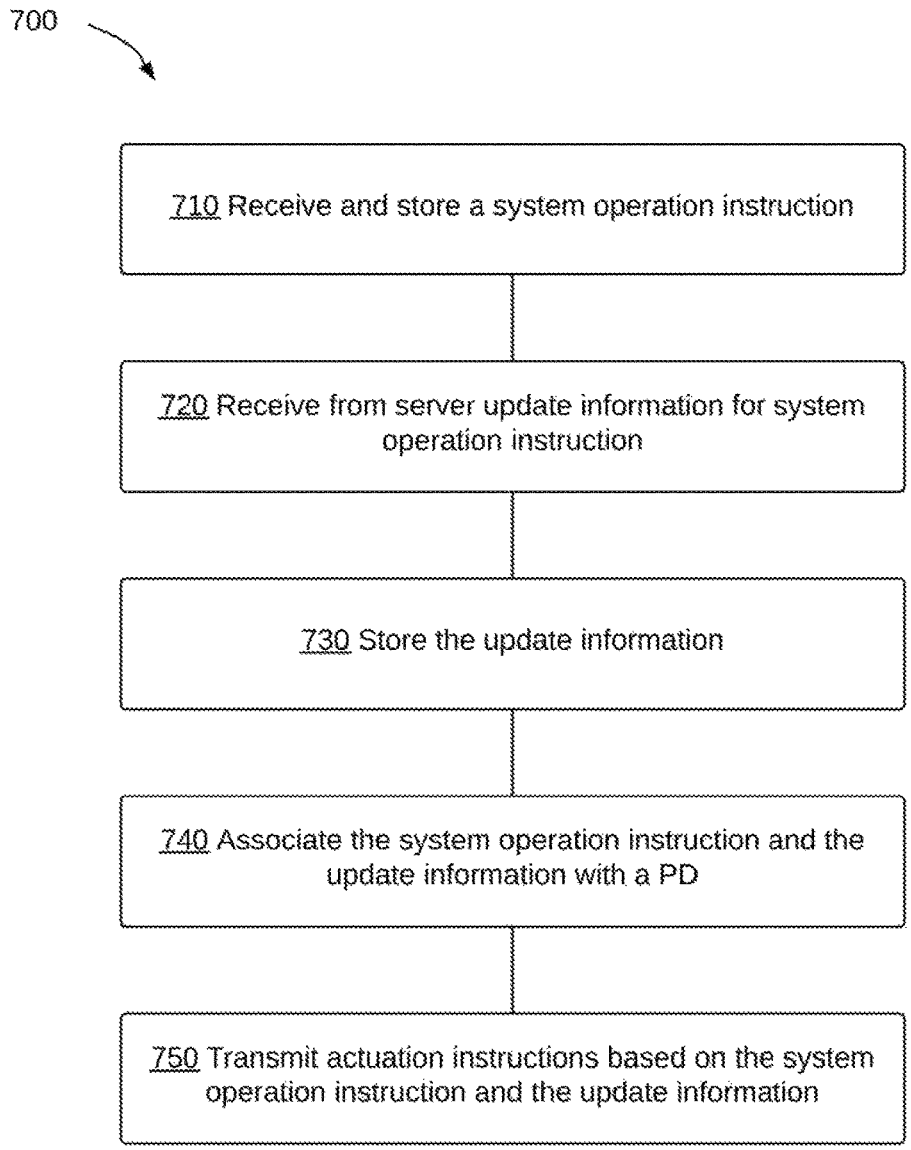
FIG. 7 depicts an example method for communicating over a single-hub dual modulation network.

FIG. 7 depicts an example method, method 700 for communicating over a single-hub dual modulation network. At block 710, a PNH of a stand-alone LAN receives and stores a system operation instruction. The PNH comprises a long range transceiver and a cloud-side transceiver networked to a server that is part of a cloud of servers. At block 720, the PNH receives, at the cloud-side transceiver and from the server, update information for she system operation instruction. At block 730, the PNH stores the update information. At block 740, the PNH associates the system operation instruction and the update information with a PD having a Long range transceiver and an actuation mechanism. The PD is located remotely front the PNH within the stand-alone LAN. At block 13, the PNH receives and stores location information associated with the PD. At block 1350, the PNH transmits, via the PNH long range transceiver, actuation instructions for the PD based on the system operation instruction and the update information.

A specific embodiment of method 700 includes one wherein the PD is an access gate for controlling access through a perimeter fence. The actuation instructions include access control instructions for the perimeter fence. For example, the PNH receives and stores pin numbers associated with authorized users of the access gate. The PNH associates the pin numbers with the access gate. The access gate receives the access control instructions. The server pushes an updated list of authorized pins to the PNH, which stores the authorized pins. In some embodiments, the updated list of authorized pins includes unauthorized pins. The PNH forwards the updated pins to the PD. In one embodiment, a user enters a pin into the access pad, and the access pad compares the entered pin to the pin numbers stored at the gate. If the pin matches a stored pin, the access pad unlocks the access gate. Otherwise, the access gate is not unlocked, and in some embodiments, the access pad notifies the user that access is denied.

Figure 8:
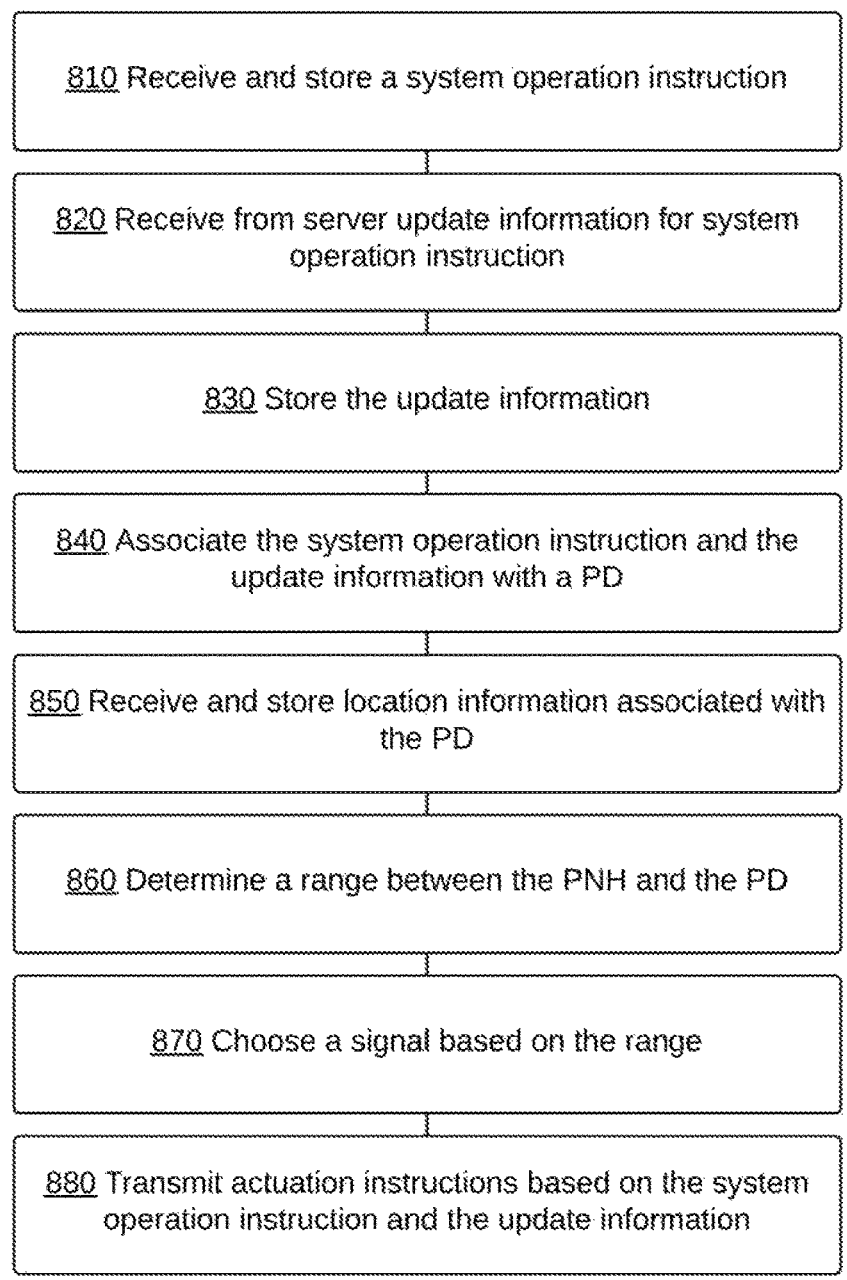
FIG. 8 depicts another example method for single-hub cloud-networked stand-alone LAN communication.

FIG. 8 depicts another example method, method 800, for single-hub cloud-networked stand-alone LAN communication. At block 810, a PNH of a stand-alone LAN receives and stores a system operation instruction. The PNH comprises a long range transceiver and a cloud-side transceiver networked to a server that is part of a cloud of servers. At block 820, the PNH receives, at the cloud-side transceiver and from the server, update information for the system operation instruction. At block 830, the PNH stores the update information. At block 840, the PNH associates the system operation instruction and the update information with a PD having a Long range transceiver and an actuation mechanism. The PD is located remotely from the PNH within the stand-alone LAN. At block 850, the PNH receives and stores location information associated with the PD. At block 860, the PNH determines a range between the PNH and the PD. At block 870, the PNH chooses a long range SS signal or a narrowband FSK signal based on the determined range. For example, the long range SS signal is, in some embodiments, a long range SSFH signal. At block 880, the PNH transmits, via the PNH long range transceiver, actuation instructions for the PD based on the system operation instruction and the update information.

Figure 9:
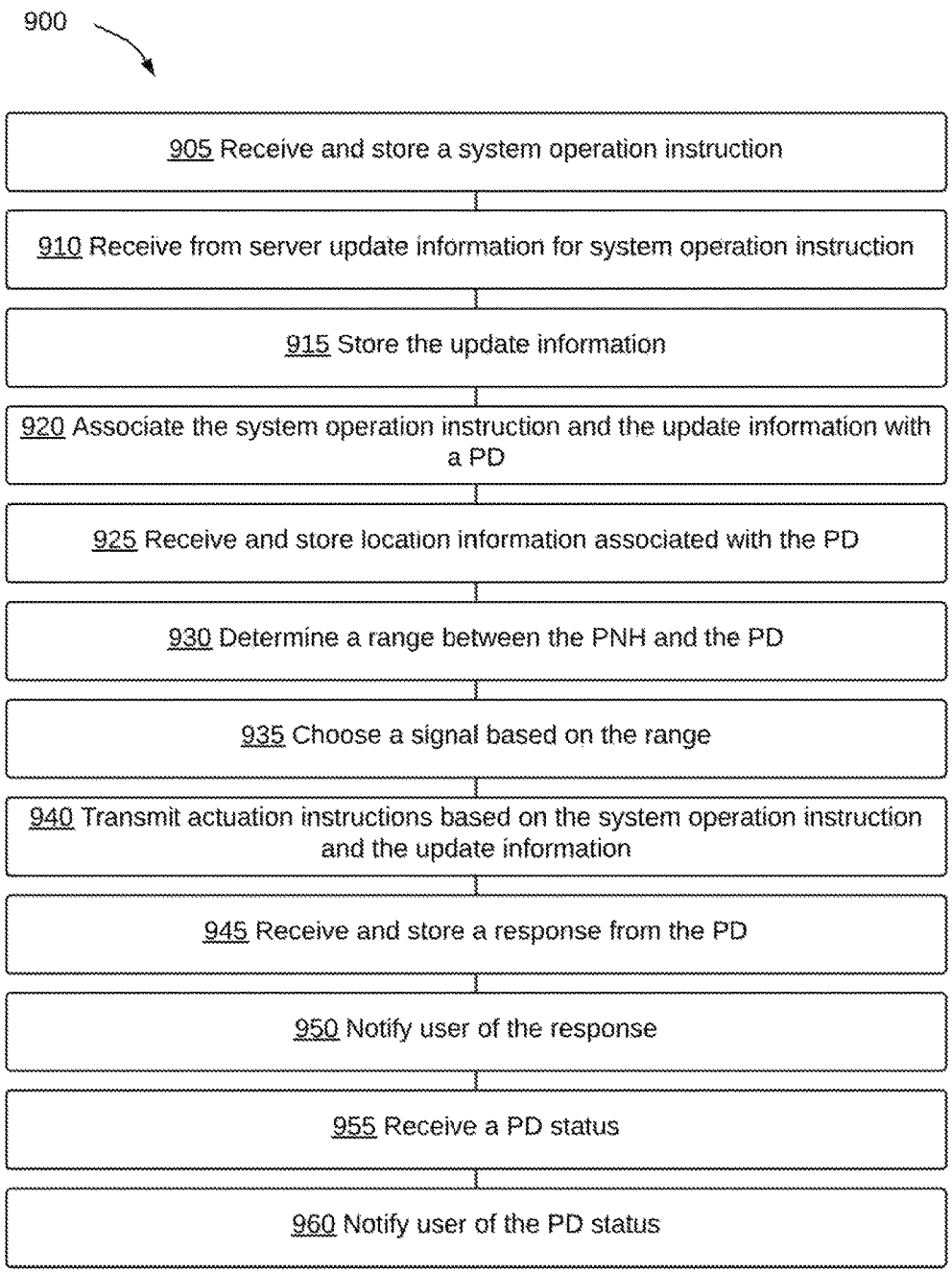
FIG. 9 depicts another example method for single-hub cloud-networked stand-alone LAN communication.

FIG. 9 depicts another example method, method 900, for single-hub cloud-networked stand-alone LAN communication. At block 905, a PNH of a stand-alone LAN receives and stores a system operation instruction. The PNH comprises a long range transceiver and a cloud-side transceiver networked to a server that is part of a cloud of servers. At block 910, the PNH receives, at the cloud-side transceiver and from the server, update information for the system operation instruction. At block 915, the PNH stores the update information. At block 920, the PNH associates the system operation instruction and the update information with a PD having a Long range transceiver and an actuation mechanism. The PD is located remotely from the PNH within the stand-alone LAN. At block 925, the PNH receives and stores location information associated with the PD. At block 930, the PNH determines a range between the PNH and the PD. At block 935, the PNH chooses a long range SS signal or a narrowband FSK signal based on the determined range. For example, the long range SS signal is, in some embodiments, a long range SSFH signal. At block 940, the PNH transmits, via the PNH long range transceiver, actuation instructions for the PD based on the system operation instruction and the update information. At block 945, the PNH receives and stores a response from the PD in response to the actuation instructions. For example, in one embodiment, a garage door receives an actuation instruction to open, but malfunctions. In response to the instruction and malfunction, the garage door sends a response to the PNH notifying the PNH of the malfunction. At block 950, the PNH notifies a user of the response via the server and a user device. For example, the PNH notifies the user of the garage door malfunction. At block 955, the PNH receives a log signal communicating a PD status. For example, in one embodiment, a manually-switched light transmits a log signal to the PNH communicating its status change, either from off to on, on to off, or adjustment in brightness, and the PNH receives the log signal and updates the light's status. At block 960, the PNH notifies a user of the PD status via the server and a user device. For example, the PNH notifies the user the lights have been turned on.

Figure 10:
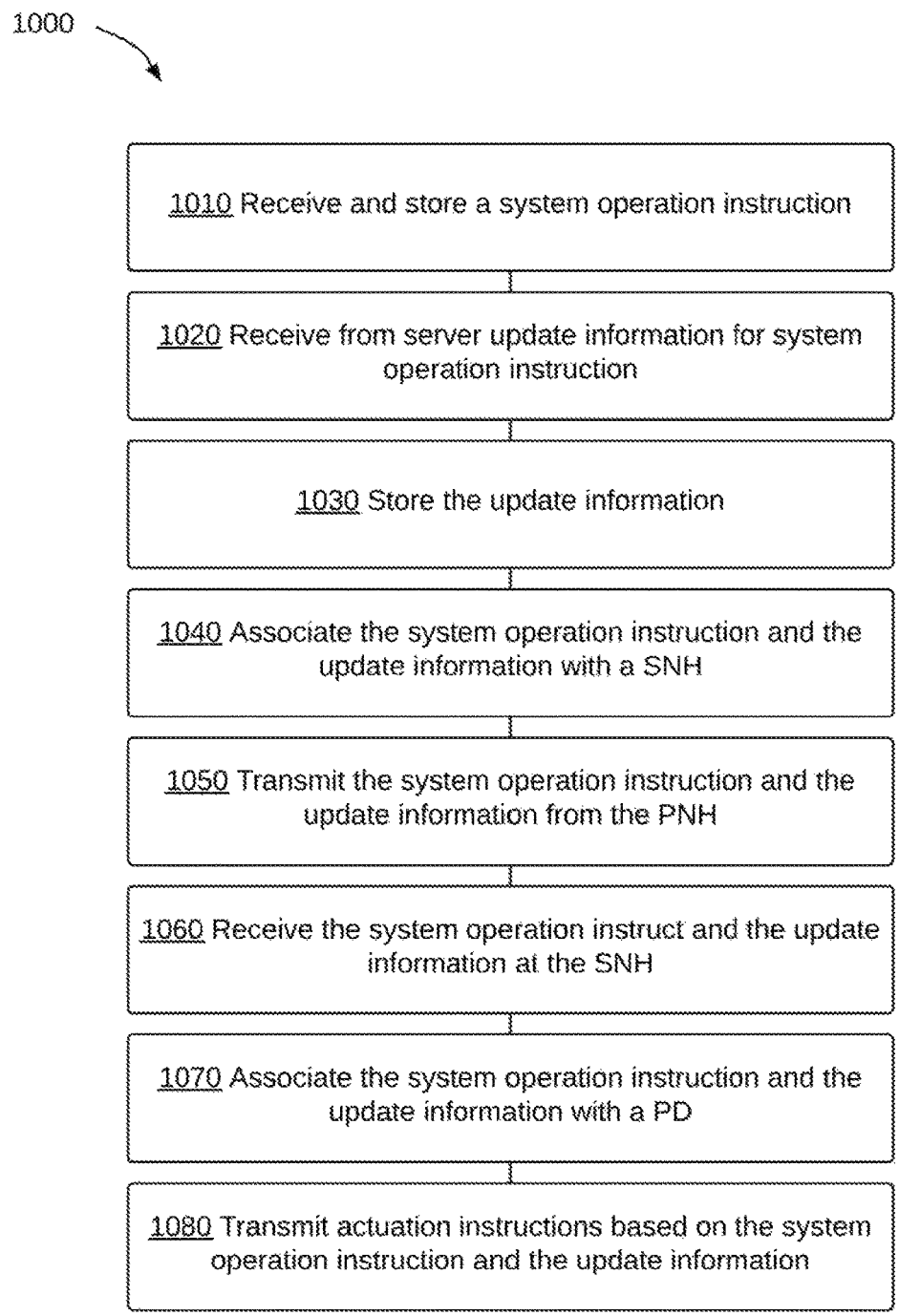
FIG. 10 depicts an example method for communicating over a multi-hub cloud-networked stand-alone LAN.

FIG. 10 depicts an example method, method 1000, for communicating over a multi-hub cloud-networked stand-alone LAN. A multi-hub cloud-networked stand-alone LAN performs, in some embodiments, any or all of the steps described above with regard to methods 700, 800, 900. Additionally, a multi-hub cloud-networked stand-alone LAN acts, in some embodiments, as both a single-hub network and a multi-hub network, where a PNH directly controls PDs, and controls SNHs which in turn control PDs not controlled by the PNH. Or, in some embodiments, the PNH and SNHs share control of PDs.

At block 1010, a PNH of a stand-alone LAN, having a Long range transceiver and a cloud-side transceiver networked to a server that is part of a cloud of servers, receives and stores a system operation instruction. At block 1020, the PNH receives, at the PNH cloud-side transceiver and from the server, update information for the system operation instruction. At block 1030, the PNH stores the update information. At block 1030, the PNH associates the system operation instruction and the update information with a SNH of the stand-alone LAN having a Long range transceiver and located remotely from the PNH within the stand-alone LAN. At block 1040, the PNH transmits, via the PNH long range transceiver, the system operation instruction and the update information. At block 1066, the SNH receives, at the SNH long range transceiver, the system operation instruction and the update information. At block 1070, the SNH associates the system operation instruction and the update information with a PD having a long range transceiver and an actuation, mechanism, and located remotely from the SNH and the PNH. At block 1080, the SNH transmits, via the SNH long range transceiver, actuation instructions for the PD based on the system operation instruction and the update information.

A specific embodiment of method 1000 includes one wherein the PD is an access gate for controlling access through a perimeter fence. The PD instructions include access control instructions for the perimeter fence. For example, a PNH receives and stores pin numbers associated with authorized users of the access gate. Additionally, the PNH receives updated pins updated by a user and sent to the PNH via the server. The PNH associates the pin numbers and updated pin numbers with a SNH that controls the access gate. The PNH transmits the pin numbers and updated pin numbers to the SNH. The SNH receives and stores the pin numbers and updated pin numbers associated with authorized and/or unauthorized users of the access gate. The SNH associates the pin numbers and updated pin numbers with the access gate. The SNH transmits the pin numbers and updated pin numbers to the access gate. The access gate receives the pin numbers and updated pin numbers. In one embodiment, a user enters a pin into the access pad, and the access pad compares the entered pin to the pin numbers stored at the gate. If the pin matches a stored pin, the access pad unlocks the access gate. Otherwise, the access gate is not unlocked, and in some embodiments, the access pad notifies the user that access is denied.

A multi-hub dual modulation network can be particularly beneficial in embodiments where there are too many PDs for a PNH to control directly, and/or in embodiments where many PDs are outside a PNH-PD transmit-receive range, but within a SNH-PD transmit-receive range.

Figure 11:
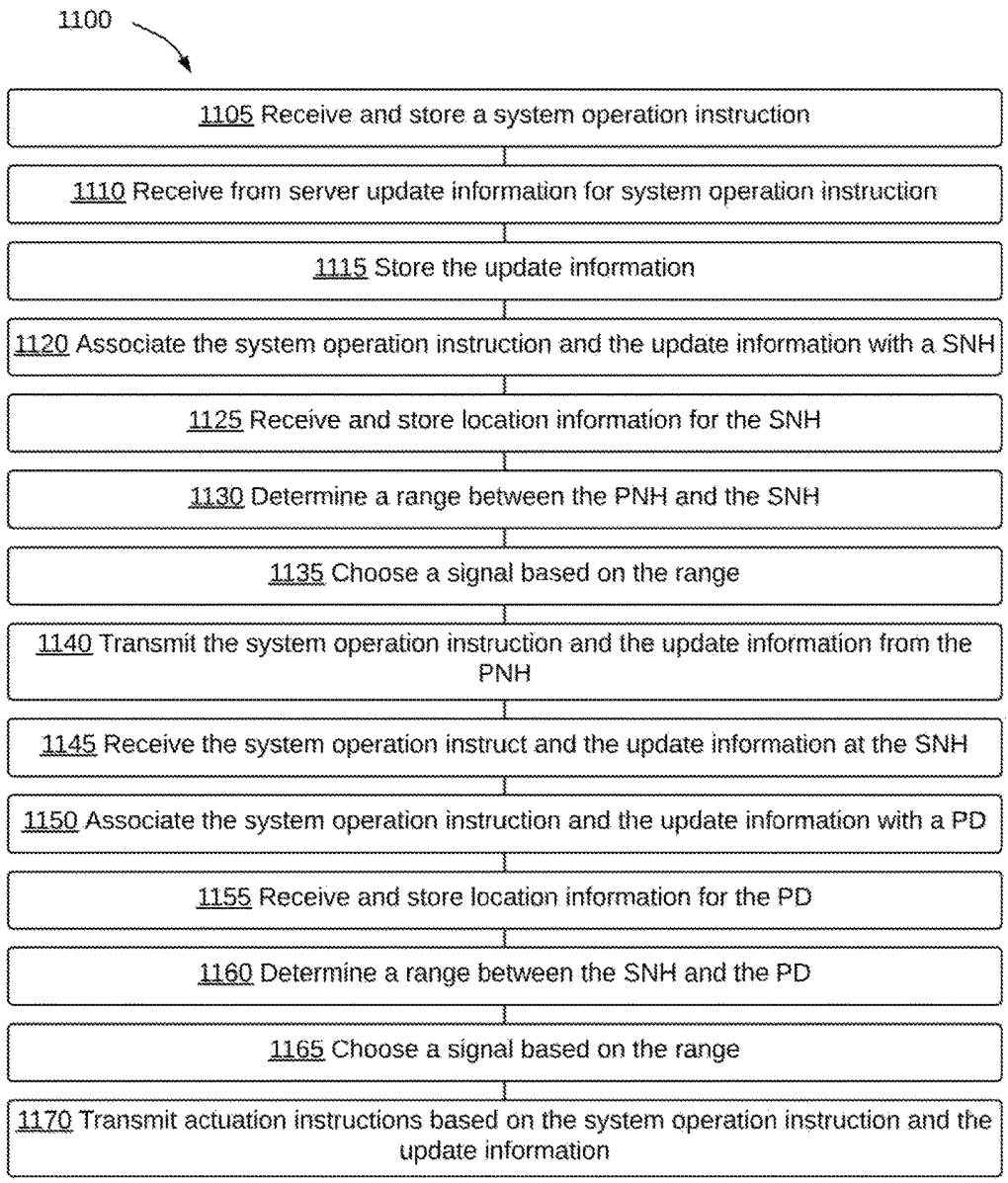
FIG. 11 depicts another example method for communicating over a multi-hub cloud-networked stand-alone LAN.

FIG. 11 depicts another example method, method 1100, for communicating over a multi-hub cloud-networked stand-alone LAN. At block 1105, a PNH of a stand-alone LAN, having a Long range transceiver and a cloud-side transceiver networked to a server that is part of a cloud of servers, receives and stores a system operation instruction. At block 1110, the PNH receives, at the PNH cloud-side transceiver and from the server, update information for the system operation instruction. At block 1115, the PNH stores the update information. At block 1120, the PNH associates the system operation instruction and the update information with a SNH of the stand-alone LAN having a Long range transceiver and located remotely from the PNH within the stand-alone LAN. At block 1125, the PNH receives and stores location information for the SNH. At block 1130, the PNH determines a range between the PNH and the SNH. At block 1135, the PNH chooses, based on the range, a long range SS signal or a narrowband FSK signal. At block 1140, the PNH transmits, via the PNH long range transceiver, the long range SS signal or the narrowband FSK signal communicating the system operation instruction and the update information. At block 1145, the SNH receives, at the SNH long range transceiver, the system operation instruction and the update information. At block 1150, the SNH associates the system operation instruction and the update information with a PD having a long range transceiver and an actuation mechanism, and located remotely from the SNH and the PNH. At block 1155, the SNH receives and stores location information for the PD. At block 1160, the SNH determines a range between the SNH and the PD. At block 1165, the SNH chooses, based on the range, a long range SS signal or a narrowband FSK signal. At block 1170, the SNH transmits, via the SNH long range transceiver, the long range SS signal or the narrowband FSK signal communicating actuation instructions for the PD based on the system operation instruction and the update information.

The invention claimed is:

1. A system comprising:
a stand-alone local area network;
a server outside the stand-alone local area network, wherein the server is part of a cloud of servers, the server comprising:
hardware processors that process system operation information updates from a user for the stand-alone local area network;
hardware memory that stores the system operation information updates; and
a transceiver for communicating the system operation information updates to the stand-alone local area network;
a primary network hub (PNH) of the stand-alone local area network comprising:
a PNH microcontroller that stores the system operation information, wherein the PNH microcontroller further receives the system operation information updates and associates the system operation information with a secondary network hub (SNH) of the stand-alone local area network;
a PNH cloud-side transceiver networked to the cloud of servers for receiving the system operation information updates from the server; and
a PNH local area network Long range transceiver that communicates via a long range spread spectrum (SS) signal or a narrowband frequency shift keying (FSK) signal;
a plurality of secondary network hubs (SNHs) of the stand-alone local area network, wherein each of the plurality of SNHs is associated with a distinct set of peripheral devices (PDs), wherein the plurality of SNHs include the SNH, wherein the SNH comprises a long range transceiver, wherein the SNH is located in a different building than the PNH, wherein the SNH receives location information for a peripheral device (PD), determines a range between the SNH and the PD, chooses a long range spread spectrum (SS) signal or a narrowband frequency shift keying (FSK) signal based on the range, and transmits, via the long range transceiver, the system operation information; and
a set of peripheral devices (PDs) associated with the SNH, wherein the set of PDs includes the PD of the stand-alone local area network, the PD comprising a PD microcontroller, a PD local network transceiver, and an actuation mechanism, wherein the system operation information includes actuation instructions for the PD.

2. The system of claim 1, wherein the PNH, the PD, or both, further comprise a battery for off-power grid operation.

3. The system of claim 1, wherein a PNH microcontroller firmware comprises instructions for long range spread spectrum frequency hopping signal communication.

4. The system of claim 3, wherein a PD communication firmware comprises instructions for long range spread spectrum frequency hopping signal communication.

5. The system of claim 4, wherein the SNH further comprises a battery for off-power grid operation.

6. The system of claim 4, further comprising SNH microcontroller firmware and wherein the SNH microcontroller firmware comprises instructions for long range spread spectrum frequency hopping signal communication.

7. The system of claim 1, wherein a PD communication firmware comprises instructions for long range SS signal communication, narrowband FSK signal communication, or both.

8. The system of claim 1, further comprising the secondary network hub (SNH) of the stand-alone local area network comprising:
a SNH microcontroller having communication firmware for long range SS and narrowband FSK signal communication via the SNH Long range transceiver.

9. The system of claim 1, further comprising a user device networked to the server, wherein the user device updates the system operation information via the server.

10. The system of claim 1, further comprising a user device, wherein the user device comprises a long range transceiver that communicates via a long range spread spectrum (SS) signal or a narrowband frequency shift keying (FSK) signal for direct communication with the stand-alone LAN.

11. A method comprising:
receiving, at a secondary network hub (SNH) of a stand-alone local area network, a system operation instruction and an update instruction from a primary network hub (PNH) of the stand-alone local area network, wherein the SNH comprises a long range transceiver, wherein the SNH is one of a plurality of SNHs associated with the PNH, and wherein each of the plurality of SNHs is associated with a distinct set of peripheral devices (PDs);
associating the system operation instruction and the update information with a peripheral device (PD) of the stand-alone local area network, wherein the PD comprises a long range transceiver and an actuation mechanism, and wherein the PD is located in a different building than the PNH within the stand-alone local area network;
receiving and storing, at the SNH, location information for the PD;
determining, at the SNH, a range between the SNH and the PD;
choosing, at the SNH, a long range spread spectrum (SS) signal or a narrowband frequency shift keying (FSK) signal based on the range; and
transmitting, via the SNH long range transceiver, actuation instructions for the PD based on the system operation instruction and the update information using the chosen long range SS signal or the chosen narrowband FSK signal.

12. The method of claim 11, wherein the long range SS signal is a long range spread spectrum frequency hopping signal.

13. The method of claim 11, further comprising receiving and storing a response from the PD at the SNH in response to the actuation instructions.

14. The method of claim 13, further comprising notifying a user of the response via a server and a user device.

15. The method of claim 11, further comprising receiving a log signal communicating a PD status.

16. The method of claim 15, further comprising notifying a user of PD status via the server and a user device.

17. A method comprising:
receiving and storing a system operation instruction at a primary network hub (PNH) of a stand-alone local area network, wherein the PNH comprises a long range transceiver and a cloud-side transceiver networked to a server that is part of a cloud of servers;
receiving, at the PNH cloud-side transceiver and from the server, update information for the system operation instruction;
storing, at the PNH, the update information;
associating the system operation instruction and the update information with a secondary network hub (SNH) of the stand-alone local area network, wherein the SNH comprises a long range transceiver, and wherein the SNH is located in a different building than the PNH within the stand-alone local area network, wherein the SNH is one of a plurality of SNHs associated with the PNH, wherein each of the plurality of SNHs is associated with a distinct set of peripheral devices (PDs);
receiving and storing, at the PNH, location information for the SNH;
determining, at the PNH, a range between the PNH and the SNH;
choosing, at the PNH, a long range spread spectrum (SS) signal or a narrowband frequency shift keying (FSK) signal based on the range;
transmitting, via the PNH Long range transceiver, the system operation instruction and the update information to the SNH using the chosen long range SS signal or the chosen narrowband FSK signal;
receiving, at the SNH Long range transceiver, the system operation instruction and the update information;
associating the system operation instruction and the update information with a peripheral device (PD) in a set PDs associated with the SNH, the PD having a long range transceiver and an actuation mechanism, and located in a further different building from the SNH and the PNH;
receiving and storing, at the SNH, location information for the PD;
determining, at the SNH, a range between the SNH and the PD;
choosing, at the SNH, a long range spread spectrum (SS) signal or a narrowband frequency shift keying (FSK) signal based on the range;
transmitting, via the SNH long range transceiver, actuation instructions for the PD based on the system operation instruction and the update information using the chosen long range SS signal or the chosen narrowband FSK signal.

* * * * *